Oct. 4, 1966 M. J. WELLS 3,277,452

APPARATUS FOR SEISMOGRAPH RECORD SECTIONS

Filed Feb. 1, 1960 8 Sheets-Sheet 1

INVENTOR.
MELVIN J. WELLS,
BY Spensley and Horn

ATTORNEYS.

FIG. 2 UNIT "A"

MELVIN J. WELLS,
INVENTOR.

BY Spensley and Horn

ATTORNEYS.

Oct. 4, 1966 M. J. WELLS 3,277,452

APPARATUS FOR SEISMOGRAPH RECORD SECTIONS

Filed Feb. 1, 1960 8 Sheets-Sheet 3

MELVIN J. WELLS,
INVENTOR.

BY Spensley and Horn

ATTORNEYS.

Oct. 4, 1966 M. J. WELLS 3,277,452

APPARATUS FOR SEISMOGRAPH RECORD SECTIONS

Filed Feb. 1, 1960 8 Sheets-Sheet 4

FIG. 4. UNIT "B"

INVENTOR.
MELVIN J. WELLS,

By Spensley and Horn
ATTORNEYS

APPARATUS FOR SEISMOGRAPH RECORD SECTIONS

Filed Feb. 1, 1960

MELVIN J. WELLS,
INVENTOR.

BY Spensley and Horn

ATTORNEYS.

Oct. 4, 1966 M. J. WELLS 3,277,452
APPARATUS FOR SEISMOGRAPH RECORD SECTIONS
Filed Feb. 1, 1960 8 Sheets-Sheet 6
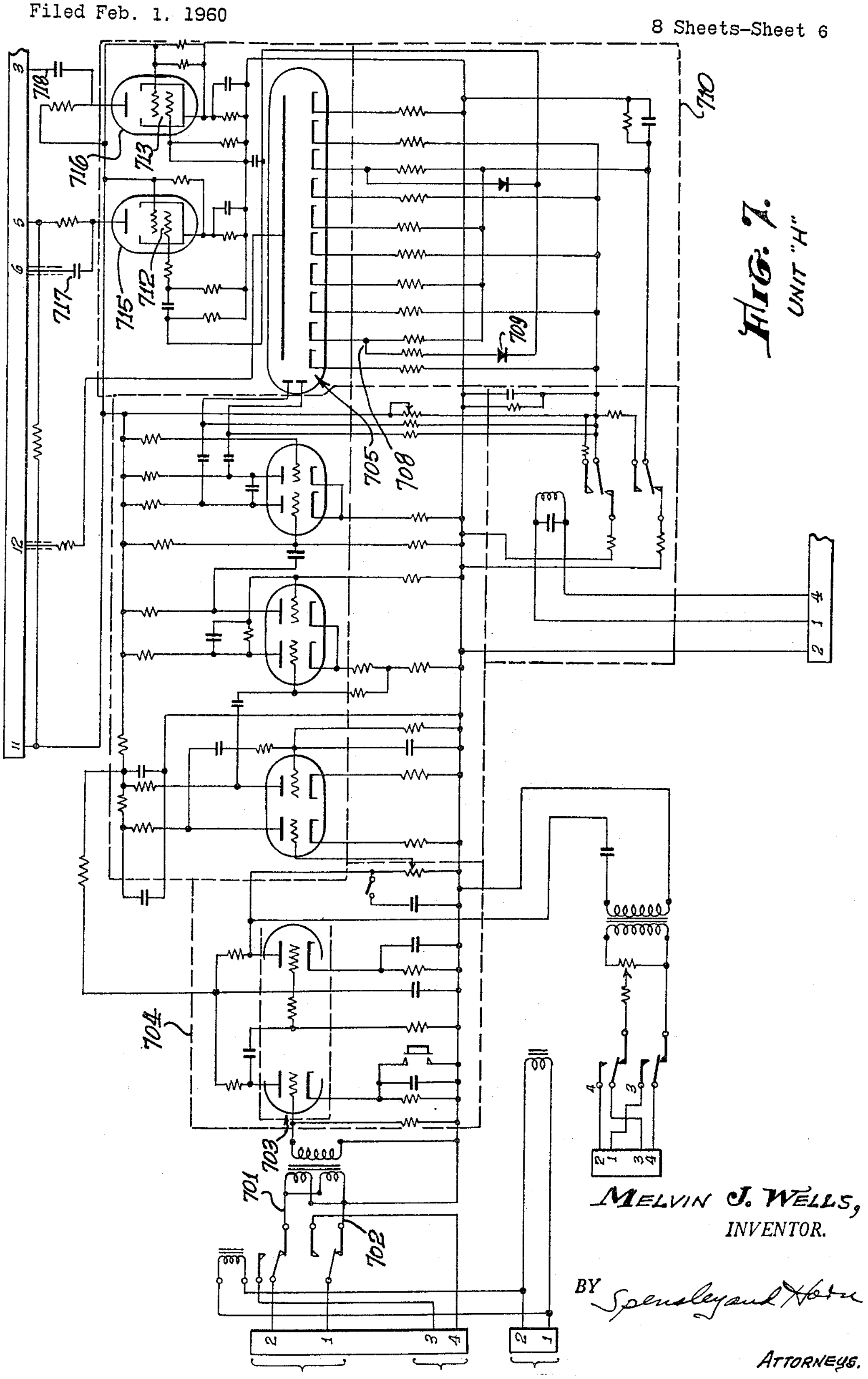
FIG. 7. UNIT "H"
MELVIN J. WELLS,
INVENTOR.
BY Spensley and Horn
ATTORNEYS.

Oct. 4, 1966 M. J. WELLS 3,277,452

APPARATUS FOR SEISMOGRAPH RECORD SECTIONS

Filed Feb. 1, 1960

8 Sheets-Sheet 7

INVENTOR.
MELVIN J. WELLS,
BY Spensley and Horn
ATTORNEYS.

APPARATUS FOR SEISMOGRAPH RECORD SECTIONS

Filed Feb. 1, 1960

INVENTOR.
MELVIN J. WELLS,
BY Spensley and Horn
ATTORNEY.

United States Patent Office 3,277,452

Patented Oct. 4, 1966

3,277,452

APPARATUS FOR SEISMOGRAPH RECORD SECTIONS

Melvin J. Wells, Torrance, Calif., assignor to Western Geophysical Company of America, Los Angeles, Calif., a corporation of Delaware Filed Feb. 1, 1960, Ser. No. 5,936
15 Claims. (Cl. 340—174.1)

This invention relates to seismographic exploration and more particularly to an improved method and apparatus for making seismograph record sections.

In making seismographic surveys by the so-called reflection method, a record is made of the earth's disturbance produced at a given point by a detonation initiated near the earth's surface at another point. In general, the record shows waves which have traversed paths close to the earth's surface and waves which have penetrated the earth and have been reflected by interfaces between two layers of different properties or characteristics. In many cases several interfaces are present at varying depths, and the record will show waves reflected from such interfaces. The amplitude of such reflected waves will vary over a considerable range depending upon the coefficient associated with each interface.

For example, in a common arrangement of seismographic exploratory and recording apparatus used for seismographic profiling work, a plurality of seismometer or detector groups are disposed in contact with the ground in a preferably straight line at opposed sides of the shot-point. A recording unit provided with suitable amplifying and recording means is electrically connected to the detectors to amplify and record the electrical impulse produced by the detectors upon the arrival at each detector group of seismographic waves generated by an explosion at the shot-point and reflected from the various underground formations.

The electrical impulses produced by the detector groups are recorded by multi-channel recording means such as magnetic drum or tape recorders with a channel corresponding to each detector group. The detected tremors are thus recorded on a time scale record together with the instant of shot initiation which is indicated on the record as a time break. The recorded information is then most generally corrected for various time scale differences which arise due to the geometry of the field arrangement, and transposed to form a visual seismograph record. The seismograph records are usually in the form of a film or paper strip showing a plurality of parallel record traces of the signals received at the various detectors. Thus, for example, if twenty-four detectors are used, a seismograph record is obtained with twenty-four parallel traces, each of which shows an initial impulse followed by a series of reflections. From the traces an analysis is made to determine information about the underlying geological strata, particularly the depth and dip of interfaces. In order to utilize the information contained in the individual seismograph records, a seismograph record section is formed to provide qualitative information and quantitative measurements of the traces obtained over an extended area of exploration. That is, the individual seismograph records, or seismograms, are in effect, assembled to yield a larger area of interest and the assembled section is commonly termed a seismograph record section. For example, each record may represent a sub-surface distance of thirteen hundred feet. The record section is then formed to represent a survey line measured in miles. Thus, in order to form a record section which is a meaningful representation of the whole area under consideration, the most common practice of the seismograph art is to form the individual seismograph records upon magnetic tapes at the field in an uncorrected condition. A visual time scale record of the seismogram is then formed at a play-back installation where the magnetic tape recording is transposed to a visual recording, such as, for example, by reproducing the multi-channeled traces upon photosensitive paper by seismographic recording cameras of the type well known to the art.

The individual visual seismograph records are then assembled in side-by-side relationship after which a photograph of the ensemble is made. However, such prior art methods involve difficulties due to the accuracy of correlation which is necessary in the assembly of a record section to produce optimum information. That is, in such seismograph records in which the time scale occurrence of various traces is of fundamental importance, it is common practice to superimpose upon the record a series of timing lines. Since the data traces in the record section are recordings of signal impulses received at the detectors, the time at which the signal is received is found by measuring the distance along the time scale direction of motion of the record from the signal to a zero time point which serves as a reference datum point. Thus, the distance along the record is a direct function of time and it is essential that timing lines or indicators placed on the record be a true indication of the time relationship of the recorded information. The time of occurrence of events on the record must be accurate. In order to achieve satisfactory results the time of occurrence of a signal should be determinable within one millisecond. For ease of time scale reference, a timing grid is often formed upon the record in which heavy lines occur along the time scale of the record at spaced intervals representing one-tenth of a second, and lighter lines are positioned at intervals between the heavier lines representing ten milliseconds along the time scale. Additionally, a line of intermediate width or weight is positioned midway between the one-tenth second lines. When the individual seismograph records are assembled into an overall record section it is essential that the timing lines be aligned for all of the records and that they occur at uniform intervals to form a common timing grid for the assembled record section. The uniformity of spacing of the timing lines is essential as discussed above in order that the distance between lines be an accurate representation of elapsed time. Thus, it is essential that the timing lines be uniformly and accurately spaced on a single record and that the same uniformity and regularity of spacing exist on the various records to form an aligned and accurate time grid on the section formed from individual records. In addition, it is necessary that each of the individual records in the record section be oriented to a common zero time reference in order that the time scale occurrence of the signal can be correlated to a physical location. In addition to the time scale occurrence of the various signals, the corrections introduced in the seismograph record are also oriented with respect to the zero time point. That is, the corrections such as the moveout corrections are made with respect to time and must commence accurately at a predetermined time relative to the time of shock initiation.

During the field recordation of the reflected signals transmitted from the plurality of seismometer detector groups to be recorded upon a tape recording, a time scale is impressed upon the tape by means such as a clock timer. The distance along the tape alone will not sufficie as an accurate time scale criterion since the length of the tape may vary after the record has been made, as discussed in greater detail hereinafter. A common method of impressing such a time scale signal upon the magnetic tape is the utilization of an oscillator to feed a one-hundred cycle-per-second sine wave to a timing channel of the tape. Thus, when the magnetic tapes are received from the field at the location of the playback operation where the magnetic tapes are to be transposed to visible recorded seismograms and subsequently formed into a seismograph section, the tapes contain a timing channel, an arbitrarily occurring time break, and the plurality of data trace channels containing the information signals reflected to the seismometer groups. The time break may occur on a separate channel or may occur on a data trace. In addition to the timing channel, the time break and the data traces, a head-pip signal will ordinarily be impressed on the magnetic tape at each channel. The head-pip signal is a fiducial signal which precedes the time break and is impressed simultaneously by each of the recording heads of the field recording machine to indicate the location and alignment of the heads relative one to the other at the commencement of the record. By such a series of head-pip signals various corrections can be made to assure time scale alignment or uniformity of the heads. Since the magnetic tapes are subjected to field use and may be stored for considerable time prior to being received at the playback location, various types of damage may occur to the tapes including stretching or shrinking due to temperature changes. Such stretching or shrinking will, of course, vary the timing channel such that if the tape is played at the playback apparatus at the same speed as when the magnetic record is made the time scale will be changed. The timing channel and the timing signal contained therein may sometimes be lost completely on a magnetic record. The timing signal may be lost, for example, due to the displacement of the magnetic head recording the timing wave by the shock of the explosion. On having been recorded it may be removed in part by scratching or removal of the oxide from the tape during handling. Additionally, when the field recorded magnetic tape is sent to the playback office, a notation by the field operators is given which indicates the time break-to-zero time correction for the record. That is, due to the fact that the detonations will occur at different depths or at locations at which the near surface weathering conditions of the area being surveyed vary from location to location, corrections must be introduced to place all of the time scale records upon a common time-scale datum line.

Accordingly, it is an object of the present invention to provide an apparatus for making a visual record of data recorded on a multi-channel magnetic tape which impresses upon said visual record a visual time scale extending from a predetermined zero time point.

It is another object of the present invention to provide an apparatus for superimposing a time scale upon a multi-channel oscillographic recording which time scale is shown by spaced lines at uniform predetermined intervals.

Another object of the present invention is to provide an improved playback apparatus for forming visual seismograms from field-recorded magnetic tape by means of which a time origin timing line can be automatically positioned at a predetermined location along the time scale of the seismogram relative to the time-break signal of the magnetic tape.

A further object of the present invention is to provide a playback apparatus for the visual recordation of multi-channel magnetic tapes which will superimpose a timing grid upon the visual records wherein the timing grid impressed upon individual records will be uniform and predetermined such that the timing grid for a plurality of such records will be aligned relative to a designated zero time point for each record and from record to record in the section. The timing grid is preferably formed of regularly spaced millisecond lines with distinguishable heavy lines at intervals of ten-lighter millisecond lines. By means of the present invention heavy lines as well as the lighter lines will always occur at the same position on the record for a given setting of the apparatus.

It is another object of the present invention to provide an apparatus for impressing a visual timing grid upon an oscillographic record wherein the spacing between lines of the grid is uniform and an accurate indication of the time elapsed along the record with such uniformity being obtainable and such spacing being equal throughout a plurality of records.

Yet another object of the present invention is to provide an oscillographic recording apparatus for forming a time-scale visual record from a first record having a timing signal impressed thereon whereby the timing signal determines the rate of recordation of the visual record such that the visual record is recorded at a predetermined time scale regardless of the rate at which the first record is played back and regardless of fluctuations or irregularities of the timing signal.

It is a further object of the present invention to provide an oscillographic playback recording apparatus for forming a visual time-scale record with timing lines impressed thereon from a previously recorded magnetic tape record having a timing signal occurring thereon wherein the rate of recordation of the visual record is determined by the timing signal by varying the speed of the motor driving the visual recording medium in response to the timing signal such that the visual record will be uniform in time scale and the timing lines will be spaced at predetermined intervals without regard to the rate at which the tape is played back and regardless of fluctuations or irregularities in the timing signal on the tape.

It is still a further object of the present invention to provide an apparatus for forming visual records from field recorded magnetic records which apparatus allows the automatic shifting of timing lines impressed thereon to a predetermined position within one millisecond of accuracy.

Another object of the present invention is to provide a playback apparatus in which time origin corrections relative to a time break in the record can be automatically and quickly made with a high degree of accuracy, thus eliminating any need to revolve the drum prior to the actual recording.

It is still another object of the present invention to provide a playback apparatus which automatically compensates for irregularities present in a timing channel on a field recorded magnetic tape to accurately orient the time of occurrence of an event in the field upon a visual record of the events, which record has a regularly spaced timing grid which is uniform from one record to the next.

Yet another object of the present invention is to provide a playback apparatus which automatically indicates and records the time interval which elapses from the occurrence of the time break to the occurrence of an arbitrarily occurring predetermined point on the time grid and allows the calibration of the record to position the point on the time break or at a predetermined position relative thereto.

The present invention comprises a playback apparatus for converting a field recorded magnetic tape having an arbitrary time break impressed thereon together with one or more data channels having information signals recorded in each of said channels to a visual time scale record, which playback apparatus includes means for impressing upon the visual record a timing grid comprising a series of uniformly spaced lines along the direction of time-scale movement of the record such that the distance between successive lines in said series is uniform and indicates a uniform lapse of time. Means are provided in the apparatus of the present invention for shifting such a time grid to a predetermined position relative to an arbitrary predetermined signal existing upon the magnetic tape. The apparatus of the present invention also includes means for determining the interval of time existing between the arbitrary signal transmitted from the magnetic tape and the occurrence of a preselected one of said timing lines and means for entering corrections into the playback apparatus for positioning the timing lines and the zero-time datum point relative to the arbitrary signal. Electronic circuit means are provided in the playback apparatus of the present invention for synchronizing the speed of the movement of the visual time-scale record being recorded with a timing signal present upon the magnetic tape to compensate for irregularities in the time scale of the magnetic tape by synchronizing the driving means which determines the rate of recordation for the recording camera with the timing signal present on the tape.

The novel features which are believed to be characteristic of the present invention both as to its organization and method of operation, together with further objects and advantages thereof, will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the limits of the invention.

In the drawings:

FIGURE 7 is a circuit diagram of the pulse discriminator and time-break amplifier designated unit H of FIGURE 1;

FIGURE 8 is a circuit diagram of the time-break line-interval timer designated unit I of FIGURE 1; and FIGURES *9a, 9b* and *9c* are a partially diagrammatic view of a mechanical time correction apparatus.

Although the utility of the present invention is not limited to the formation of visual seismograph records it is particularly applicable and of particular utility in the formation of such records. Accordingly, the invention will be described in connection with such an illustrative application. As will become more apparent hereinafter, however, other fields of utility will occur to those skilled in the art and are intended to be encompassed within this description. As a specific example, the synchronization of the driving means which moves the visual recording medium with a timing signal on the first record being played back will be especially adapted to many playback operations where a uniform time scale is desired regardless of the speed at which the first record is played. In addition, the visual record being produced can be any one of many types known to the art such as variable-amplitude, variable-area, variable-density or combinations thereof and particularly adapted to a sequential playback apparatus. For simplicity of discussion the formation of a simple variable-amplitude recording will be described throughout as illustrative, although the present invention is equally applicable to any record being formed with a timing grid impressed thereon.

Figure 1:
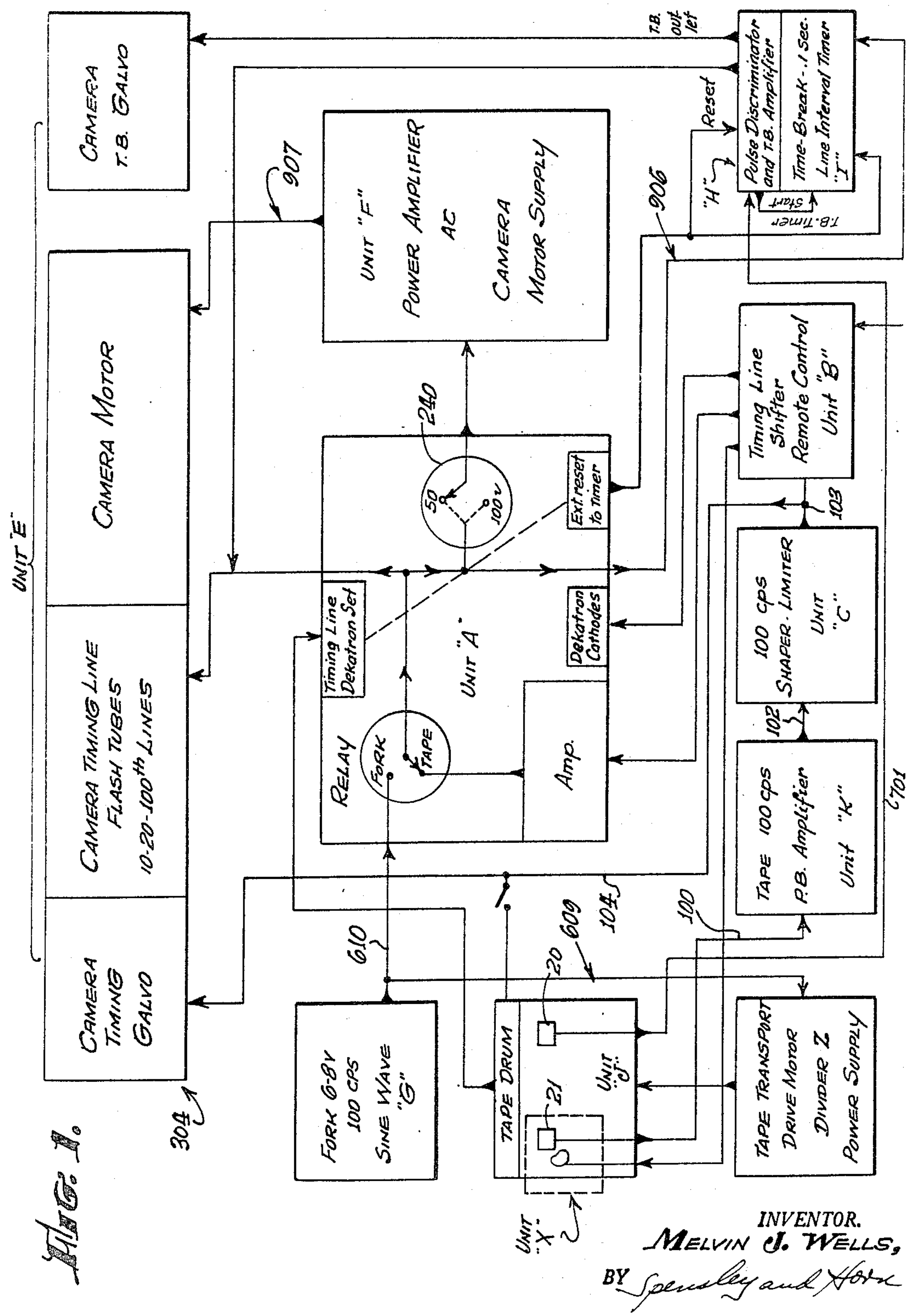
FIGURE 1 is a diagrammatic drawing of a playback apparatus of the present invention in its presently preferred form showing the interrelation of various components thereof.

Referring now to the drawings, and particularly to FIGURE 1, a magnetic tape playback or reproducing apparatus J is shown schematically in FIGURE 1. The tape playback apparatus is of the type well known to the art in which a plurality of magnetic tape reading heads are positioned at each channel corresponding to the channels recorded upon the magnetic tape at the multi-channel magnetic recording apparatus in the field. The magnetic reading or reproducing heads are positioned proximate the surface of a rotating drum having the magnetic tape record affixed to the surface thereof. By means of such apparatus the time scale position of each magnetic head may be varied to achieve time-origin corrections or time-scale calibration, all of which is well known to the art. In an illustrative reproducing apparatus a magnetic reproducing head is positioned in each channel and is mounted to be movable circumferentially with respect to the surface of the rotating drum, such that the time scale position of each magnetic head is varied to achieve the necessary time origin corrections, and time scale calibrations. The detailed means for mounting the heads with respect to the drum and for connecting the heads to apparatus by means of which the time-scale positions of the heads are shifted to introduce necessary time-scale corrections and calibrations does not form part of the present invention and will not be discussed in detail.

As discussed hereinbefore, in this illustrative embodiment an uncorrected magnetic tape record obtained by means of seismograph exploration techniques is affixed to the drum in the playback apparatus of the reproducing unit J. The tape record has a leading end and a trailing end which are affixed at the proper position on the magnetic tape drum. The length of the tape record is such that it does not cover the entire circumference of the drum. Circuit means are included in the playback apparatus for properly positioning the drum in the load position and rotating the drum through one revolution to attach the tape to the drum and return to the load position. Proximate the leading edge of the tape record are a series of head alignment pips which are impressed in each channel upon which a signal is to be recorded. The head alignment pips afford a check upon the pattern of the recording heads of the field recording machine at the particular time the record was made and permit a like pattern to be set up during the playback operation. Also, in one or more channels an input signal designated as the time break is recorded upon a predetermined channel at the time of the shot detonation. This time break may be recorded on a separate timing channel or may be recorded on one of the data traces. A time-break-to-zero correction is furnished by the field operator to correlate the occurrence of the time-break pip on the trace to a zero-time point form which the time interval along the time scale record is to measured to correlate the information signals to physical locations. In a plurality of seismographic records assembled to form a seismograph record section the zero time point must be consistent throughout the section in order that all of the detected signals occurring in the section are oriented with respect to a common time datum point. In addition, there is present on the magnetic tape record a timing channel as discussed hereinbefore which most generally comprises a sine wave impressed at a frequency of one hundred cycles per second, for example.

Figure 3:
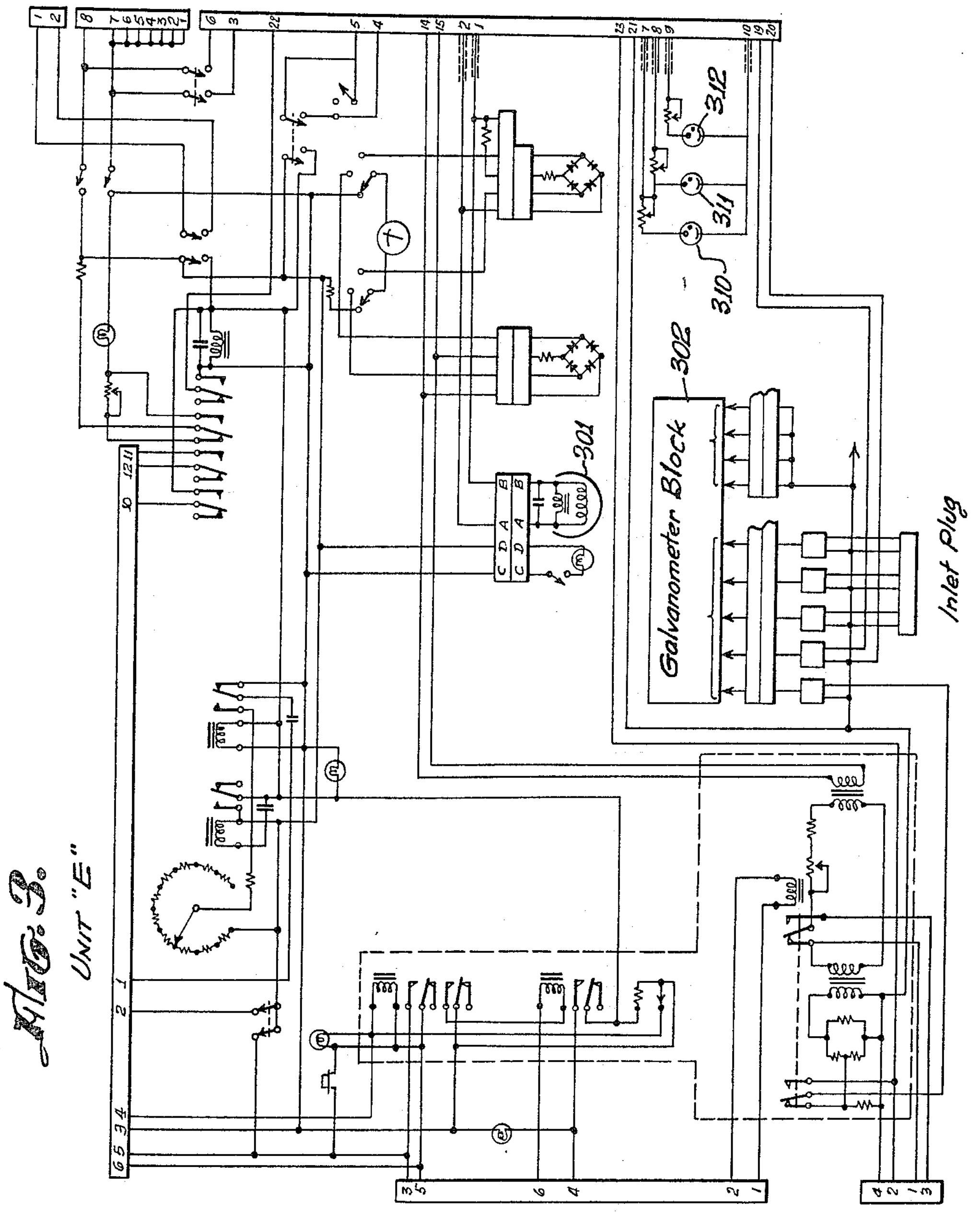
FIGURES 3 is a circuit diagram of the camera timing galvanometer, camera-timing-line flash tubes and camera motor designated unit E of FIGURE 1.
Figure 4:
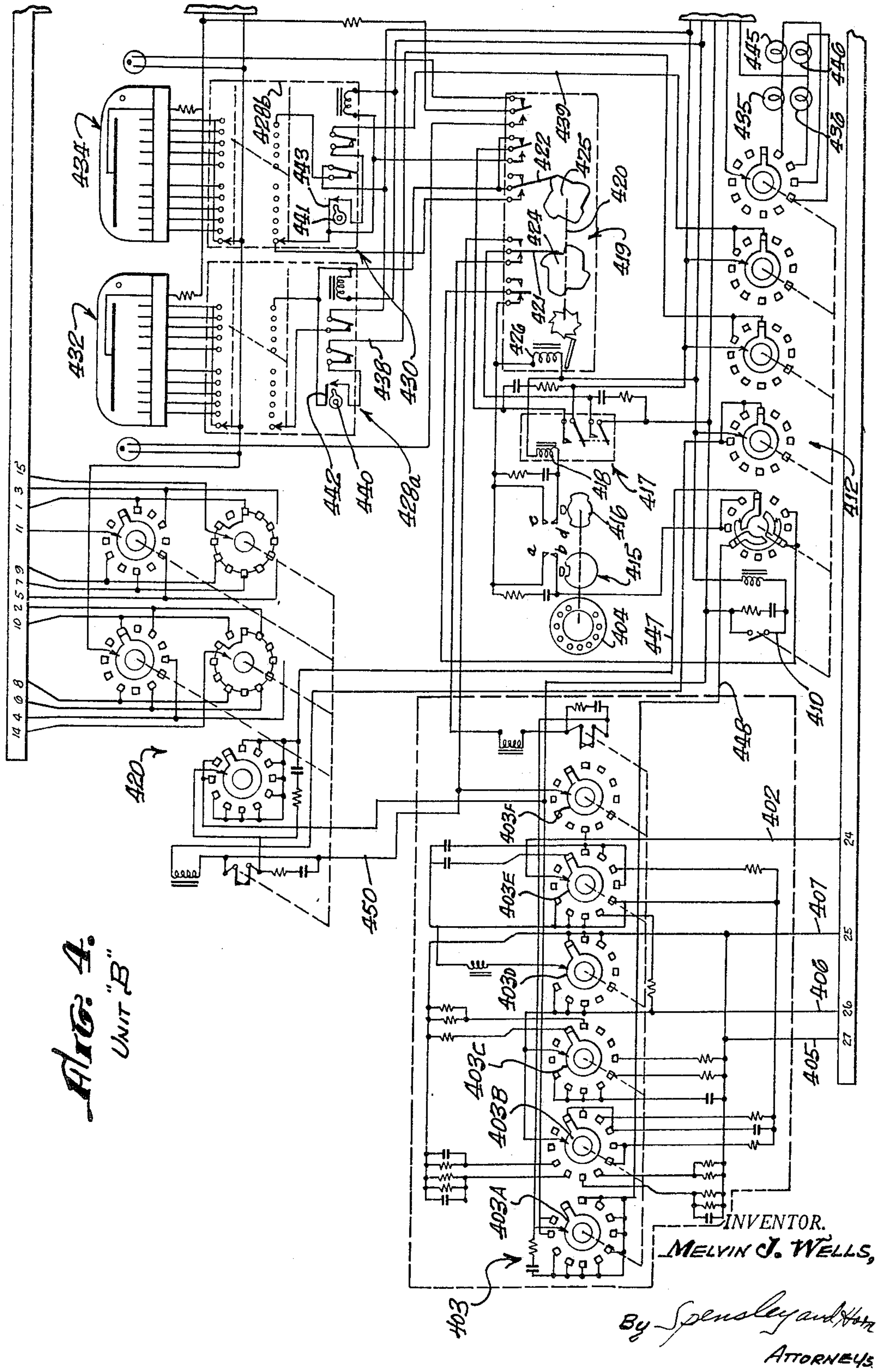
FIGURE 4 is a circuit diagram of the timing-line-shifter remote-control unit designated as unit B of FIGURE 1.

There is shown diagrammatically in FIGURE 1, and in greater detail in FIGURE 3, a camera section which includes a camera timing galvanometer, camera-timing-line flash tubes, and the camera-drive motor. The visually reproducing camera may be one of many types well known to the art, as for example, the type of camera which reproduces the oscillatory input signals as variable-amplitude traces along each channel of the multi-channel visual record. In such a camera, for example, a plurality of oscillating mirrors equal in number to the number of channels in the playback apparatus are arranged in side by side relationship. Each mirror is affixed to a vertical shaft which is in turn affixed to the movable coil of the galvanometer. The coil of each galvanometer is rotated within the permanent magnet by an amount proportional to the electrical signal impressed upon it. The intensity of the electrical signal is transmitted from the playback reading head through a suitable amplification means to the galvanometer corresponding to the respective channel of the playback apparatus. The signal intensity is impressed across the wire loop of the galvanometer to rotate the galvanometer shaft and the mirror affixed thereto about the vertical axis in an amount proportional to the electrical impulse received at the galvanometer which is in turn a function of the input signal. The camera motor and the mechanical apparatus utilized in the recording camera are of the type well known to the art for transposing an electrical signal to a visual trace. The galvanometer mirrors in the camera oscillate about the vertical so that a point of light is transmitted in a vertically fixed position to the recording medium which is typically a strip of photosensitive paper. The paper is in turn driven in a vertical direction at a constant rate of speed such that a line is exposed on the paper by the horizontally varying point of light transmitted by each mirror. Thus, the distance along the direction of movement of the paper strip is the time-scale coordinate while the amplitude of the signal is indicated by the position of the trace-line relative to a reference point in each channel. The paper strip is mounted upon an idler roller and driven in the vertical direction by a camera drive motor 301 in FIGURE 3. For purposes of this invention as will become more apparent hereinafter, the camera-drive motor must be of the type whose speed of rotation is governed by the frequency of the driving-input, alternating current. In the present embodiment a $\frac{1}{25}$ horsepower hysteresis-wound, synchronous motor 301 is utilized. The information signal intensity is transmitted by each of the reading heads (not shown) to the galvanometer block 302 where the galvanometers are caused to rotate an amount proportional to the amplitude of the information signal. The means for accomplishing galvanometer mirror rotation in response to input signals transmitted from the reading heads is well known and will not be explained in detail. For purposes of the present invention the two reading heads which read the timing signal on the tape and the channel of the tape on which the time break occurs are the reading heads of concern and are shown diagrammatically at J in FIGURE 1 as the time break head 20 and timing signal head 21. In general, referring to FIGURE 1, and as discussed in more detail hereinafter, the timing signal on the tape is read by the timing signal head 21 and transmitted over lead 100 to an amplifier K. As discussed hereinbefore, the timing signal, which is typically a 100 c.p.s. sine wave, on the tape may be distorted and irregular in spacing and amplitude. For example, the sine wave which is recorded on the tape by a clock timer may be bunched at the forward part of the signal where the tape recording drum or playback drum had not reached normal operating speed. The signal is therefore transmitted over lead 102 to unit C which is a shaper-limiter circuit designed to transmit a sine wave therefrom as a smooth sine wave of constant amplitude (but whose frequency faithfully follows the input frequency) regardless of input level changes. The output sine wave is then transmitted over leads 103 and 104 to the camera timing galvanometer 304 of the recording camera (FIGURE E) to record the sine wave on the visual record if desired. The timing signal is also transmitted over lead 103 to the timing line shifter remote control unit B and thence through the control unit A to flasher tubes 305, 306 and 307 in the camera unit E. In passing through units B and A as discussed in detail hereinafter the sine wave timing signal is changed to pulses that can actuate the flasher tubes to transmit pulses of light at the rate corresponding to the timing signal to the moving recording medium in the camera. This pulse varies in intensity such that a heavy line called a tenth line occurs every 100 milliseconds, with a line of medium intensity occurring between the heavy tenth lines to indicate 50 milliseconds. That is, unit A receives the timing signal sine wave from the tape or fork oscillator, as described hereinafter, and converts the timing wave to a series of pulses of corresponding frequency. Suitable means in puit A convert the pulses from a series of uniform amplitude to a sequential series of pulses comprising one strong pulse, four lower amplitude pulses, a pulse of intermediate amplitude, four low amplitude pulses, after which the strong pulse repeats. The lines of lightest intensity then designate intermediate intervals of 10 milliseconds. As discussed hereinbefore, it is necessary to orient the above described timing grid such that it originates at a predetermined time relative to the time break in order to designate a zero time point. For ease of measurement it is necessary that a heavy tenth line occur at the zero time point. Accordingly, in units B and A the time grid is shifted in time in two respects. Firstly, since the time break occurs arbitrarily with respect to the 100-cycle wave it will also occur arbitrarily with respect to the timing lines and may be positioned at any point between two adjacent 10-millisecond lines. Since accuracy to the order of 1 millisecond is required, it is necessary to shift the timing lines such that the time break occurs at a predetermined point with respect to the timing line or that the zero time point line occurs at a position on the camera record relative thereto within one millisecond. It is therefore necessary to shift the line through a time scale distance of from 0 to 9 milliseconds. Similarly, for ease of measurement, it is necessary that a heavy tenth line occur at the zero-time point. Again, since the zero-time point is abritrary, relative to the grid, it may be necessary to shift the grid through 10 to 90 milliseconds to place a tenth line at the proper position. Thus, by units A and B, the grid can be shifted through a distance corresponding to 0 to 99 milliseconds to orient the grid properly. Thus, if the time-break signal occurs midway between peaks of the timing signal sine wave and the timing lines on the visual record occur at a position corresponding to the sine-wave peaks a shift of the timing lines through five milliseconds would be required to position the time break on a timing line. If the timing line upon which the time break pip then fell were the third timing line after a tenth line, a correction of 70 milliseconds would be required to position the time-break pip on the succeeding tenth line. The total calibration correction necessary would therefore be 75 milliseconds. This correction is obtained by rotating the telephone dial, millisecond selector 404 as shown in FIGURE 4 and described hereinafter. In addition, the millisecond correction for time-break-to-zero-time of the record is similarly introduced. If the field information denotes the correction to be 21 milliseconds after time break, the correction 21 is introduced through the millisecond correction dial 404. When a tape is run and the time break pip detected and recorded on the visual record, a tenth line will be recorded by a flasher tube 21 milliseconds later as the zero-time line of the record. The twenty-one millisecond correction is indicated on numeral indicator tubes and will remain until a subsequent correction is introduced, thereby serving as a memory recordation of the time break-to-zero-time correction in the record.

As previously described, the time-break pip will be preceded on the time-break channel by a head-alignment pip. It is necessary therefore to discriminate between the two individual pulses in order that the time-break pip is recorded as such and that the timing lines are corrected relative to this time-break pip on the visual record. This function is performed by the pulse discriminator and time break amplifier unit H. The time-break pip is transmitted to the time-break recording galvanometer and to the camera timing line flasher tubes which forms a corresponding timing line to show the location of the time break.

It is necessary for any one set of conditions of playback recording, that the various units of the apparatus be reset to the same starting point for each revolution of the drum. The starting point is determined by unit B and is required to be the same point for each operation in order that the timing lines will occur at the same position on the records for each successive tape drum revolution.

Since the timing grid is being impressed continuously and will be at an arbitrary position relative to the time break before the corrections discussed above are introduced, it is necessary to determine the extent of calibration correction necessary to place the tenth line on the time break, i.e., it was previously assumed as an example that the required calibration correction was 75 milliseconds. This correction would be determined by the time-break-tenth-second-interval timer I in FIGURES 1 and 8. The time break on the tape is transmitted to the unit I over lead 701 while the occurrence of the first tenth line at the record is transmitted to the interval timer I over the lead 906. The interval timer I then reads and records the calibration correction required (75 in the illustrative example). This reading and timing operation is performed during the operation of the tape drum as the tape is attached to the drum during the loading process prior to the forming the visual record.

In unit A, means are provided for transmitting a driving voltage to the synchronous camera drive motor 301 through a suitable power amplifier such as unit F. That is, the synchronizing signal is generated by unit A and transmitted to the power amplifier where it is amplified and transmitted over lead 907 to the camera-drive motor 301. The frequency of the A.C. driving voltage is varied directly as the frequency of the timing signal from the tape and the timing lines flashed by the timing-line flash tubes are similarly varied. Thus, if the frequency of the timing signal transmitted from the tape is 100 c.p.s. the timing lines are flashed to the visual record at the rate of 100 per second. With the frequency selector switch 240 in the 50-cycle position the motor 301 is driven by a 50 c.p.s. input which is determined by the natural synchronous frequency of the motor used. When, however, the tape has shrunk, for example, the peaks of the 100 c.p.s. sine wave thereon will be closer together and if the tape is played back at the normal rate of speed the true frequency of the timing signal will increase. Simultaneously, the rate of rotation of the paper drive motor will increase correspondingly as will the rate of occurrence of the timing lines. Accordingly, the timing lines and the data recorded will be at the same time scale, i.e., the linear distance between timing lines will remain uniform. As a further example, if the magnetic tape with an accurate and uniform 100 c.p.s. timing signal thereon is played back at twice the normal speed of recording, the frequency of the timing signal will be 200 c.p.s. The records played back on this system will be identical to the original field recording regardless of recording speed variations, irregularities in the physical dimensions of the tape, or inconsistencies in the speed of the drum used for the playback operation.

The tape playback amplified unit indicated by the letter K in FIGURE 1 is a voltage amplifier of a type well known to the art. It merely receives the output signals over lead 100 from the tape-drum unit J through the magnetic head associated therewith and amplifies the same. The signals generated by the head are typically of the order of microvolts and what is needed in order to carry out the hereinafter described circuit operations requires a higher voltage level. Thus, the amplifier unit K increases the signal received from unit J, which is of the order of microvolts, to millivolts.

Figure 5:
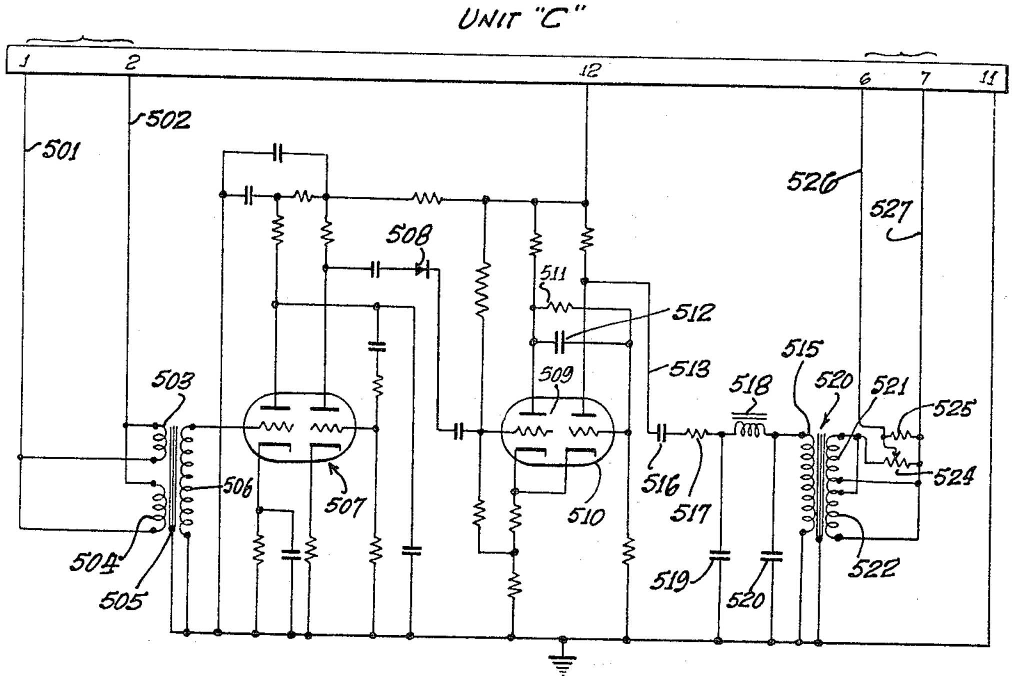
FIGURE 5 is a circuit diagram of the timing-signal shaper-limiter designated unit C of FIGURE 1.

In the specific embodiment herein being discussed, the output from amplifier unit K will bear the same polarity as the input signals hereto and the output voltage level thereof should never be below 10 millivolts. The output signals from amplifier unit K is fed over lead 102 to shaper and limiter unit designated as C in FIGURE 1 and shown in detail in FIGURE 5. The input signal from amplifier unit K is received over leads 501 and 502 to the two parallel input windings 503 and 504 of transformer 505. The transformer 505 serves to match the output impedance of the units K to that of C and serves further to step up the voltage of the received signals from the order of approximately 10 millivolts to approximately 100 millivolts. It thus has a turns ratio of approximately 10:1. The signal generated across the output winding 506 of transformer 505 is fed into amplifier 507 which is a 12AU7 vacuum tube. The output signal from this amplifier stage is fed through rectifier 508 into grid 509 of stage 510*a* of two stage amplifier 510. Amplifier 510 is also a 12AU7 vacuum tube. This stage is a trigger amplifier and serves to amplify the received, approximately 100-millivolt signal to a level of the order of approximately 500 millivolts. The rectifier 508 permits only the positive half-wave of the input signal, which signal is typically a sine wave to reach the grid 509 of stage 510*a*. A resistor 411 and a capacitor 512 serve to connect the plate of stage 510*a* to the grid of stage 510*b* in order to change the shape of the signal from a half-rectified sine wave to a half-rectified square wave. It further serves to amplify the signal to the order of approximately 1 volt.

The output signal from the plate of stage 510*b* is fed over lead 513 to the primary winding 515 of transformer 520 through a series tuned circuit consisting of capacitor 516, resistor 517 and inductor 518, together with condensers 519 and 520. The signal thus generated by the tuned circuit and which is fed into the primary winding 515 is again a half-rectified sine wave. Transformer 520 includes two step-down secondary windings 521 and 522. This transformer 520 steps down the amplitude from the approximate 1-volt level to approximately 150 millivolts. The level of this output voltage may be somewhat varied by a potentiometer 524 which is connected across both secondary windings 521 and 522. A resistor 525 which is also connected across both secondary windings 521 and 522 serves to match the output impedance of transformer 520 with the input impedance of the next stage. Further, the two secondary windings 521 and 522, together with the reflected impedance of the primary winding 515 and the series tuned circuit results in an output signal at output leads 526 and 527 which is a complete sine wave.

The output signal from 100 c.p.s. limiter and shaper unit C, FIGURE 3, is conducted by leads 526 and 527 and presented to the input leads 401 and 402 of the timing-line shifter unit designated as unit B in FIGURE 1 and shown in detail in FIGURE 4. Unit B includes a plurality of different phase shifting circuits not shown which are of a type well known to the art in order to selectively introduce ten different time delays which are in increments of one millisecond from 1 to 9 milliseconds. These circuits consist of various combinations of inductors, capacitors and resistors which may be mechanically selected and interconnected in a predetermined arrangement and having predetermined values in order to produce the specific delay desired in milliseconds. These time delays are selected by a switch 403 which forms part of the timing line shifter unit B. The switch 403 includes six decks; 403A through 403F, all of which are affixed on a single shaft not shown. The position of the switch 403 and the resultant time delay is determined by the telephone-dial millisecond corrector 404. The delay circuit which introduces the time delay hereinabove mentioned results in an insertion loss. Therefore, the amplitude of the output signal from unit B to unit A over output leads 405 and 406 results in a reduction of the amplitude of the output signal to approximately the order of 10 millivolts. Of course, this signal will be shifted in time by the selected 1 to 9 milliseconds.

Figure 2:
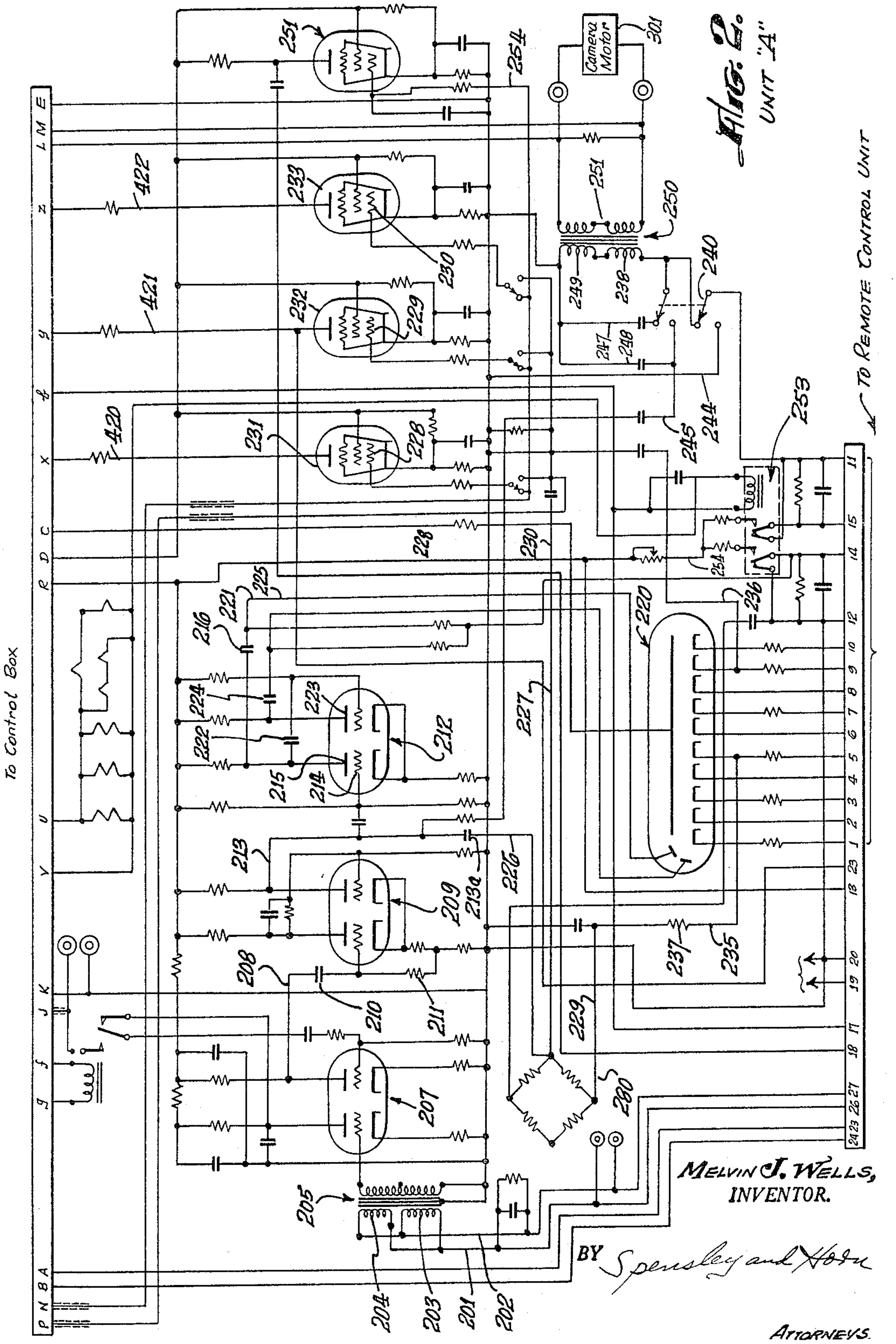
FIGURE 2 is a circuit diagram of the camera motor drive unit and timing-line shifter designated as unit A in FIGURE 1.

The output signal generated at leads 405 and 406 by unit B are received over leads 201 and 202 of timing line shifter unit A which is shown in detail in FIGURE 2. The input signal over leads 201 and 202 will be a distorted sine wave; the distortion being introduced by the time-delay network selected. This sine wave is impressed across the primary windings 203 and 204 of input transformer 205. This input signal is amplified by linear amplifier 207 which is a 12AU7 vacuum tube and which operates in a manner similar to that hereinabove discussed with reference amplifier of the first stage of 507 of unit C. The output signal from amplifier 207 is then fed over lead 208 through capacitor 210 to amplifier 209 which is also a 12AU7 vacuum tube. Due to the coupling capacitor 210, resistor 211 and the fact that the two cathodes of stage 209 are common, the sine-wave signal introduced to the amplifier 212 appears as a square-wave signal at the output of amplifier 209 at lead 213. The output signal from amplifier 209 is fed to the grid 214 of amplifier 212 which is a 12AX7 vacuum tube. This serves to shape the signals from a square-wave input at the input grid 214 of the 12AX7 tube 223 to a sharp, single, negative-polarity pulse. There result two separate output signals from the square-wave signal received on the grid of the first stage of tube 212. This presents the above mentioned, sharp, negative pulse on the plate 215 of the first stage of tube 212. It is then fed through capacitor 216 to one of the guides 957 of the decade counter tube 220 over lead 221. The decade counter tube is of the type identified as a Decatron GS10G, where Decatron is a registered trademark of Baird-Atomic, Incorporated of Cambridge, Massachlsetts, or by the identifying numeral 6476 of the Sylvania Electric Company. The tube 220 is a cold cathode, bidirectional decade counter tube designed for use in medium speed decimal counting apparatus. The count is determined by noting the position of the glow of any one of the ten radially spaced cathodes around an axially positioned anode. The tube 220 has thirty cathodes equally spaced on a circle about a central anode disc. The cathodes are divided into ten main or output cathodes and twenty intermediate guide cathodes. The discharge from the tube can be made to move in succession along the cathode series by a successive application of voltage pulses to each cathode. Simultaneously, as this pulse is applied to the guide it is also applied to the grid of the second stage of tube 212 through capacitor 222. This causes a similar pulse on the plate 223 of the second stage from plate 223 through capacitor 224. This pulse is applied over lead 225 to the second guide of the tube 220, causing the glow to transfer to the next cathode thereof.

Referring again to unit B shown in FIGURE 4, switch 410 therein selects the proper cathode of Decatron cathode tube 220 which is the GS10C tube of unit A. This occurs in response to the number first dialed by the phone dial 404. Switch 403 selects the proper delay circuit as above mentioned in response to the second number dialed in a manner hereinafter to be explained. The circuit in connection with Decatron cathode 220 operates in the following manner: When the coil 252 of relay 253 of unit A is not energized, arm 3 makes contact with contact 1 and arm 6 makes contact with contact 8. The cathode circuits numbered 1 through 10 of tube 220 are then terminated in a normally operating condition. That is, any one of the cathodes can glow and if the tube receives a pulse it will step from one cathode to the succeeding cathode. When the relay 252 is energized by the reset switch (not shown) on the tape drum in unit J, nine of the cathodes of the tube 220, that is all, except the selected one which remains terminated, are no longer terminated and they are biased by the high voltage line 254. Thus, regardless of the position when the relay 252 is energized, the glow will transfer to this terminated cathode and will there remain regardless of the input pulses, until the relay 252 is deenergized.

The output signal from tube 209 over lead 213 is a 100 c.p.s. signal and it is transmitted over leads 226, 227 and 230 to the input grids 228, 229 and 230 of pentodes 231, 232, and 233 respectively. These pentodes in the embodiment shown are 6BQ5 vacuum tubes. The pulses from cathodes numbered 5 and 9 of Decatron cathode 220 are also fed to grids 228, 229 and 230 over leads 235 and 236. These pulses, i.e., from cathodes 5 and 9 produce the 50- and 100-millisecond lines on the tape record and are of a higher intensity than are the 10-millisecond lines. The 50-millisecond line produced by the pulse from cathode 50 of tube 220 is of a somewhat lower intensity than the 100-millisecond line as this pulse is attenuated by the 150K resistor 237 which leads to the input lead 227 through lead 229 and the 200K resistor of the bridge 280. The 100-millisecond pulse, on the other hand, goes directly to the various grids 228, 229 and 230 of tubes 231, 232 and 233 without passing through an attenuating resistor.

The 10-millisecond lines are produced by pulses of a lower magnitude than the 50-millisecond pulse as follows. Output pulses from the second stage of tube 209 over lead 213, 0.02 microfarad capacitor 213*a*, and leads 226, 227 and 230 and 0.05 microfarad capacitor 230*a* and then through switches 231*a*, 231*b* and 231*c* (in the position opposite that shown in the drawing and the switch being preset) introduce the 10-millisecond pulses. Thus, two different amplitude signals are generated by the tube 220 resulting in an output that is a spike-shaped pattern at lead 230 in FIGURE 2. These output signals represent the timing lines on the photographic record section produced by the present invention playback system. The output signals from tubes 231, 232 and 233 are delivered over leads 420, 421, and 422 to glow tubes 310, 311 and 312 associated with the oscillographic camera, FIGURE 3, which put out pulses of light to produce the timing lines on the completed record section in a manner well known to the art.

Again referring to FIGURE 2, it is seen that every other cathode of the Decatron cathode tube 220 goes to ground through winding 238 of transformer 250 when relay 253 is in its normal position and toggle switch 240 is set at the 50 c.p.s. position. If, on the other hand, the toggle switch is set at the 100 c.p.s., all 10 cathodes go to ground directly over leads 244. The 100 c.p.s. signal on lead 213 is then applied to transformer 238 through condenser 245. Thus, the output of transformer 250 is 100 c.p.s. to drive the camera motor power amplifier 245 through toggle switch 240. The five cathodes which ordinarily go to ground through transformer winding 238 are numbered 2, 4, 6, 8 and 10 and do not include resistors while the other cathodes 1, 3, 5, 7 and 9 do include resistors in their circuits. When switch 240 is in the 100 c.p.s. position, the 100 c.p.s. signal from the output of tube 209 goes to ground through transformer 250. Switch 240 also selects the appropriate tuning capacitor 247 or 248 to shape the signal on the primary winding of transformer 250 to result in a sine wave output signal at the secondary winding 251 thereof. This output sine wave signal goes to the A.C. camera motor supply indicated as unit F of FIGURE 1. A fourth pentode 251 which is also a 6BQ5 receives a pulse over the lead 254 every 100 milliseconds. Thus, this tube produces an output signal every 100 milliseconds which is fed to the stop circuit on the interval timer unit I of FIGURE 1 which turns the timer off. Unit I is shown in detail in FIGURE 8 and will hereinafter be explained.

Again, referring to unit B, the operation of the function switch 410 thereof will now be explained.

The function switch 410 when actuated causes the five decked, four position switch 412 associated therewith to step once in the clockwise direction. The unit B must discern between a first and second signals received by dialing of dial 404. Thus, as the first digit is dialed by the operator, the following occurs. The contacts *a* and *b* associated with cam 415 are closed. These contacts are only open when the dial is at rest. Thus, for example, if the number 9 is dialed, contacts *a* and *b* close. As the dial is released the cam 416 rotates and will continue to rotate causing the contacts *c* and *d* associated therewith to open and close nine times while the contacts *a* and *b* remain closed. Thus, the movable arms 1 and 2 of relay 417 make contact with the stationary contacts 3 and 4 thereof nine times upon receipt of the nine pulses at the coil 418 of relay 417. Each dial operation thus turns the cam shaft 920 once and thus either arm 421 or 422 associated with cams 424 and 425 respectively, is in the energized position while the other is in the relaxed position. While these pulses are being received by relay 417, coil 426 becomes energized and remains energized during this entire interval. Upon the dialing of this first digit, relay 417 energizes relay switches **438*a* and 438*b* through relay 419. The coils of switches 428*a* and 428*b* each receive a number of pulses corresponding to the digit dialed by telephone dial 404. Thus, tube 432 which is a 6844A will light up and indicate the number dialed through the contacts of relay switch 438*a*. The coil of relay 438*a* simultaneously energizes the cathode selector switch 420 which selects the corresponding cathode of Decatron cathode 220 in unit A of FIGURE 2 and simultaneously energizes 428*a* which selects the corresponding number on tube 432. Upon the next dialing of dial 404, relay 428*b*, tube 434, and switch 403 receive the second number dialed through the contacts controlled by cam 425. It should be noted that switch 428*b* and switch 403 include a digit carry provision. Thus, if there is a number which has previously been introduced, it is added to the digit dialed. If the sum of these two millisecond digits exceeds nine, a pulse from switch 428*b* and 403 is presented to switch 428*a* and 420 respectively to step their position to the next succeeding position and switch 403 steps switch 420 which in turn steps the signal received over lead 450** one position.

Again referring to FIGURE 4 wherein the timing line shifter unit B is shown in detail, another effect of its operation will now be explained.

When beginning the playback of a particular tape by unit J, the function switch 410 is manually actuated. This causes the four-position switch decks associated therewith to step one position in a clockwise direction from the previous position. It is to be noted that all five decks, **412*a*, 412*b*, 412*c*, 412*d* and 412*e* are aligned and mounted on a single shaft. The operator closes the switch 410 until the calibration correction indicator light 435 illuminates, indicating that the switch is in position 1, which is the starting position. Under this circumstance the first numbered position on dial 404 will operate the switch 420 contacts AB–CD, relays 417 and 426, and therefore contacts 421 and 422 associated with cams 424 and 425. If, for example, the number 5 is dialed, this number will appear on tube 432 and cathode 5 on the Decatron cathode tube 220 of unit A is selected by the switch 420 through contact 5** thereof.

Since relay 426 has been actuated, the second number dialed by dial 404 will actuate the relays 417, 426 and **428*b* and will select the number on tube 434 while simultaneously causing switch 403 to step to the position corresponding to the second number dialed over dial 404**.

It should be noted therefore that the calibration correction determined for the particular tape has now been introduced.

The function switch 410 is again actuated, causing switch 412 to come to rest at position 2, which is the zero-position, thus causing the light 436 to illuminate. This disables switches **428*a* and 420 and actuates switches 428*b* and 403 through movable contacts 421 and 422. Thus, a voltage is placed through leads 438 and 439 causing relays 442 and 443 associated with switches 428*a* and 428*b* to remain energized so that they will continue to step until cams 440 and 441 cease rotating. These cams step a portion of 360° until they open relays 442 and 443. This is the zero position on tubes 432 and 434. This has effectively allowed the calibration correction to remain in the system and has zeroed the indicators 432 and 434**.

Now the function switch 410 is again actuated by the operator causing the decks **410*a*, 410*b*, 410*c*, 410*d* and 410*e* to come to rest at the position numbered 3, which is the time break correction position, resulting in illumination of light 445. This results in an operation identical to the calibration correction. That is, the first digit dialed by the operator over dial 404 operates relays 417, 436, 428*a* and 420 causing tube 432 to indicate the number thus dialed and the second digit operates switch 403 and relay 428*b* causing tube 434 to light, indicating the second number dialed. It should be noted that this time break correction position 3** is used for the corrected tape playback.

If the function switch 410 is again closed, it will step to position number 4, or the reset position, setting everything back to zero and resulting in illumination of light 446. This results in the energizing of leads 447 and 448 which causes switches 420 and 403 to go to the deenergized position, which is the zero position since **428*a* and 428*b* also return to zero. This is accomplished as all points of switches 420 and 403 are at the zero position and are deenergized. Therefore, the stepping of both switches 420 and 403** are continued until the zero point is reached.

The operation of unit H will now be explained. The circuitry of unit H is shown in detail in FIGURE 7. The input signal to the time-break discriminator H is received over leads 701 and 702 from the time-break tape head 20 of unit J. The time-break magnetic track, the signals of which are read by the time-break-head, normally has but two pulses recorded thereon. These pulses differ in amplitude and in shape, and are typically randomly spaced with respect to each other. The first pulse is called the head alignment pulse while the second pulse is designated as the time-break pulse.

It is to be noted that the function of circuit H is to differentiate between the first and second pulses hereinabove mentioned so that only the second pulse will actuate the interval timer unit I shown in FIGURE 1.

The time-break amplifier circuit inscribed within the dotted rectangle designated as 704 includes a 12AY7 vacuum tube and is the substantial equivalent of the circuit shown and described in unit A. The amplifier circuit 704 rather than receiving a 100 c.p.s. signal as does the circuit of unit A, receives the head alignment pulse and the time-break pulse. Circuit 710 includes a Decatron tube 705 which is set to the zero position. The zero position is that which results in the glow of the cathode 1 of the tube 705. When the first pulse, that is, the head alignment pulse, is received from the tape head through leads 701 and 702 and through amplifier 704, the glow from cathode 1 of tube 705 will transfer to cathode 10 thereof.

The next pulse which is received over leads 701 and 702 from the tape head, namely the time-break pulse, causes the glow to transfer from cathode 10 to cathode 9 on tube 705. Thus, a pulse is transmitted over lead 708 through diode 709 to the grids 712 and 713 of output tubes 715 and 716 which are 6BQ5 pentodes. The output at the plates of tubes 715 transmits a pulse over lead 717 to the start circuit of unit I. At the same time, a pulse is transmitted over lead 718 from the plate of tube 716 to unit A. The amplitude of the output signal from the circuit 704 is similar to that produced by the unit K heretofore discussed. It merely serves to increase the voltage level to a sufficiently high value to permit operation of unit H. The signal from the magnetic head is typically of the order of microvolts and the amplifier 704 raises it to the level of millivolts. It should further be noted that the circuit 710 further increases the voltage level from the order of millivolts so that the output at leads 717 and 718 is of the order of volts.

The operation of the interval timer unit I of FIGURE 1 will now be explained with reference to the detailed drawing thereof which is shown in FIGURE 8. The circuit included within the dotted rectangle 820 includes four Decatrons 820*a*, 820*b*, 820*c* and 820*d* which display the time interval counted by the interval timer of unit I. The circuit within the dotted rectangle 821 is a 1000 k.c. crystal-controlled oscillator of a type well known to the art. Two frequency-divider circuits 822 and 823 receive the 100 k.c. signal from 821 and in turn supply a driving frequency to circuit 820. The circuits within rectangle 824 and 825 are gate circuits which permit the passage therethrough of signals received from circuits 822 and 823 only when these gates are pulsed from units A and H, respectively. Thus, the driving signal to circuit 820 is received from circuit 822 when the start gate 824 is opened by a pulse from unit H. This causes the Decatron tubes in circuit 820 to count the number of pulses received from the oscillator. The circuit 820 will stop counting when the stop gate 825 is opened to pass a signal to the counter circuit 820. This occurs when a pulse is received by stop gate 825 from unit H. It should be noted that the circuit 823 sends out the 1,000th milliseconds signals while the circuit 822 sends out the 100th milliseconds signals. The signal from circuit 823 is fed to Decatron 820*d* of circuit 820 causing the cathode to change one position for each pulse received. Upon receipt of every ten pulses, Decatron cathode 820*d* feeds one pulse to Decatron 820*c*, likewise Decatron 820*c* feeds a pulse to Decatron 820*d* after it has been energized ten times. This continues until the stop pulse signal from unit A is received. Thus, the circuit 820 will present a signal which may be visually read to determine the time interval between the time-break pulse and the next tenth line, which is determined by the time delay between pulses from units H and A, respectively. The circuit included within the rectangle 840 opens, after the first pulse from circuit 824 is received, and allows the high-frequency signal from circuit 823 to be applied to Decatron tube 820*d*. Likewise, circuit 840 stops the signals from circuits 822 and 823 when a pulse is received at circuit 825 from unit H.

Figure 6:
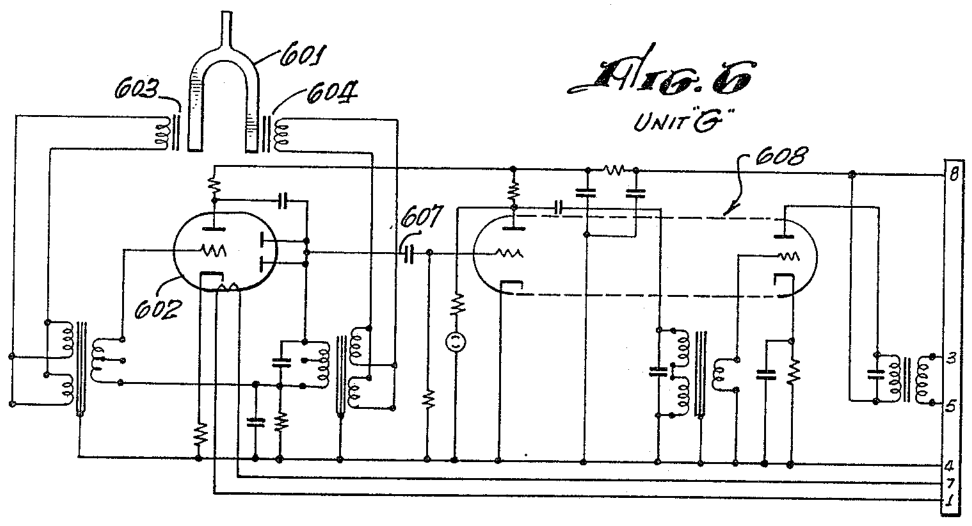
FIGURE 6 is a circuit diagram of the fork-oscillator sine-wave generator designated unit G in FIGURE 1.

Referring now to FIGURE 1 and FIGURE 6, as discussed hereinbefore, it sometimes occurs that the timing signal is lost from, or not present on, the tape. Unit G functions as an alternative timing-signal source when the tape timing signal is lost. As shown particularly in FIGURE 6, the timing signal is produced by a fork oscillator circuit G in which a tuning fork 601 is mounted. The fork 601 is selected to be resonant at the required frequency, i.e., 100 c.p.s. in the illustrative embodiment. A vacuum tube 602 is energized and transmits pulses of opposite polarity to coils 603 and 604 to initiate oscillation of the fork. Oscillation of the fork then causes the pulses to be fed back as a sine wave at a frequency of 100 c.p.s. which is conducted over lead 607 through an amplifier stage 608 to output leads 609 and 610. This serves as a 100 c.p.s. timing signal of alternating current at 6 to 8 volts. The 100-cycle timing signal is conducted over lead 610 through a two-position relay 1.001 of unit A and through the switch 204 to the camera-paper-drive-motor power amplifier F as discussed hereinbefore. Simultaneously, the signal is fed over lead 609 to the tape transport drive motor unit. It is essential, if no field recorded time signal is present on the tape, that the tape transport and the visual recording medium run at a predetermined relative rate. Accordingly, the tape transport drive motor is also of the type whose rate of rotation is governed by the frequency of the alternating input current to the motor. Thus, the camera-drive motor and tape transport motor will be rotated at an equal or predetermined rate. Whether the timing signal on the tape or the fork oscillator circuit is utilized to generate and shift the timing lines, the fork oscillator circuit G always serve to drive the tape drum power amplifier which furnishes a a constant frequency voltage to the drum-drive-motor.

Referring now to FIGURE 1 and FIGURES 9*a*, 9*b* and 9*c* there is shown an alternate apparatus for mechanically introducing the 0 to 9 millisecond correction previously described. This mechanical shifting apparatus is shown schematically as unit X in unit J of FIGURE 1. It has been found that it is sometimes advantageous to utilize mechanical delay for accomplishing the 0 to 9 millisecond shifting of the timing lines rather than the electrical circuit delays described hereinbefore. As previously discussed, insertion losses result due to the electrical networks in such delay circuitry and there is some distortion in the timing-signal wave. In addition, the circuitry must be energized prior to operation of the circuits in order to achieve optimum results. That is, under some conditions of operation, as for example, when the condensors are being charged or when the timing signal on the tape is of low amplitude, the delay circuits, which are tuned circuits, do not discriminate the low amplitude pulses. In such circumstances the mechanical delay apparatus of the present invention is advantageous.

Figure 9:
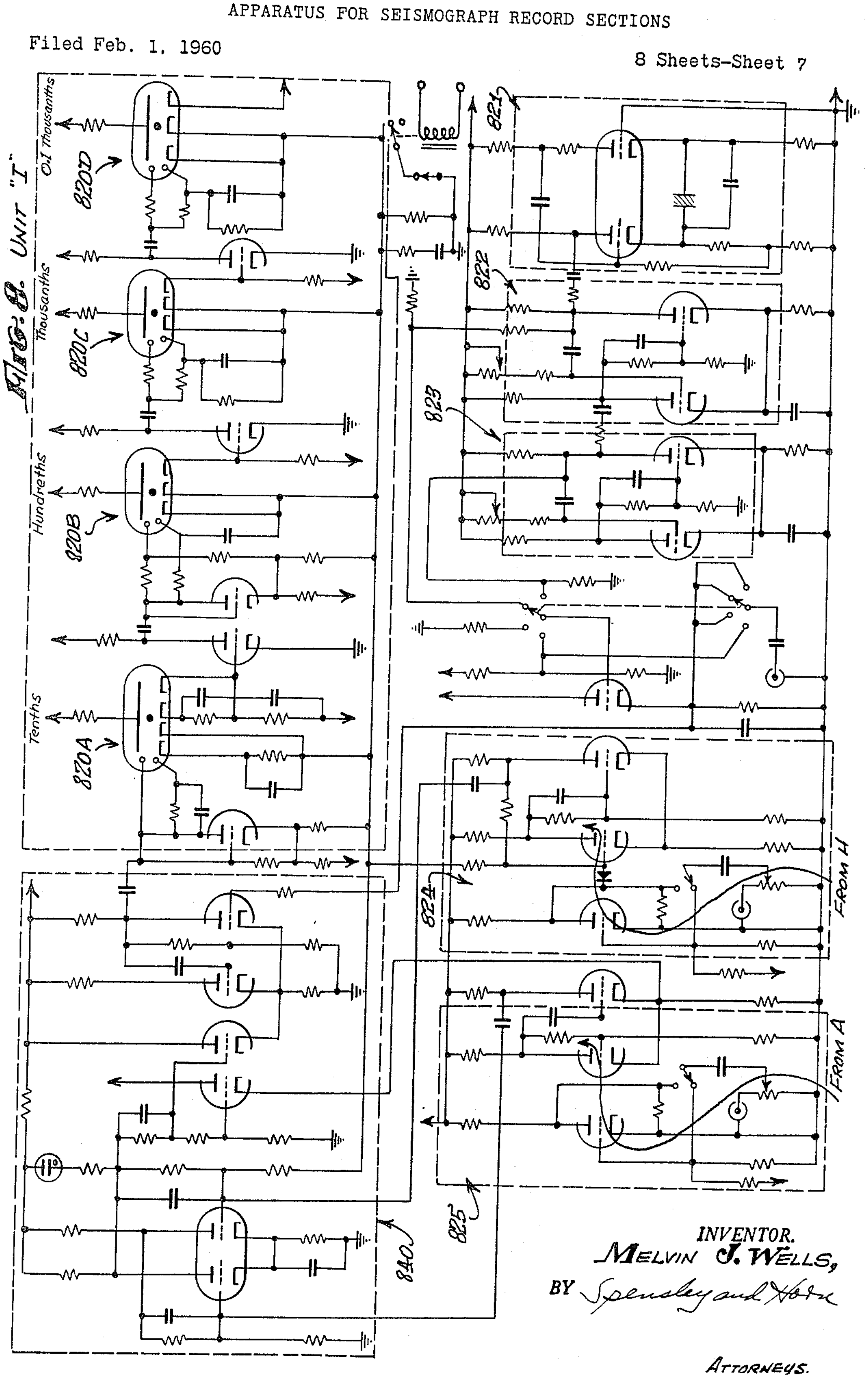
Figures 9A, 9B, 9C:
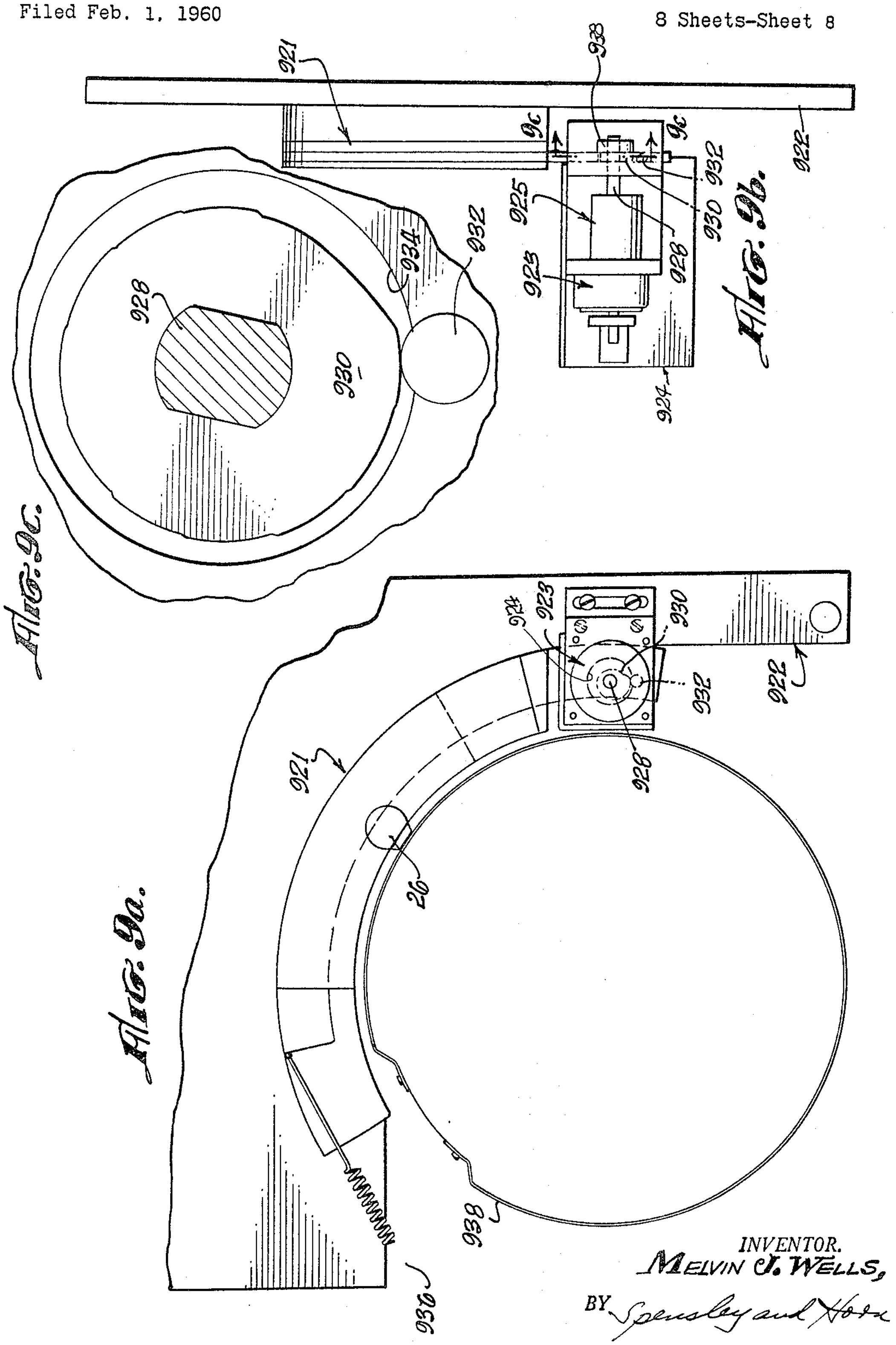

As discussed hereinbefore the 0 to 9 millisecond correction, which is introduced into the apparatus to cause a shifting of the timing lines through the selected correction to from 0–9 milliseconds, is selected by means switch 403 which forms part of the timing-line-shifter unit B. Switch 403 (FIGURE 4) includes six decks affixed on a single shaft as described in detail hereinbefore. The position of the switch 403 is determined by dialing the necessary correction on the telephone-dial millisecond corrector 404. The position of the switch 403 in the embodiment hereinabove described, in turn selects the required electrical delay circuit as previously described. In the alternative embodiment, a six-deck switch identical to switch 403 is again utilized and the circuitry required to move the switch to the correct position by means of dial 404 and to retain it in such position are also identical to that previously described. That is, in accordance with alternative embodiment of the 0 to 9 millisecond-corrector of unit X, the correction is again dialed into dial 404 in the timing-line-shifter unit B and the correction dialed determines the position of a switch 923, identical to switch 403. Switch 923 is, however, positioned at the tape drum unit J as shown in FIGURES 9*a*, 9*b* and 9*c* in which the presently preferred form of the mechanical components of the 0–9 millisecond mechanical corrector are shown partially diagrammatically. The timing-signal reading head 21 is mounted upon a head slide for circumferential movement with respect to the tape drum, which movement will result in a time-scale shift of the output signal transmitted from the tape record by the head as is well known to the art. In an illustrataive embodiment, when the tape record is played back at a normal speed of 3.6 inches per second, movement of the head 21 circumferentially through a linear distance of .0036 inch will displace the transmitted timing signal by one millisecond. The timing signal reading head is accordingly mounted upon the circumferentially movable head slide 921. As shown particularly in FIGURES 9*a* and 9*c*, proximate one end of the head slide 921 there is provided a circular opening 934. Spring means 936 are provided to urge the head slide in the direction opposite the one end. The switch 924 is affixed by suitable mounting brackets 924 to the chassis 922 of the tape drum such that it is stationary with respect to the drum 938, and the head slide 921. The switch is positioned with the shaft 928 thereof extending transversely to the head slide and the plane in which the head slide moves. In addition, the shaft extends through the opening 934 and is positioned by suitable mounting and bearing means 938. Affixed to the switch shaft 928 is the 0–9 millisecond correction cam 930. The cam 930 is also positioned within the opening 934 and rotates therein with the shaft 928. The cam is so designed that it decreases in radius in nine increments along the circumference with each decrease in radius being equal to a one millisecond displacement, or .0036 inch in the illustrative embodiment. That is, the cam is a nine-step cam with each step equal to .0036 inch with the minimum radius being the reset position and the maximum radius being nine times .0036 greater than the minimum radius. A steel ball 932 is positioned in the inner wall of the opening 934 to act as a cam follower. Thus, the diameter of the opening and the size of the cam are interdependent to allow movement of the cam within the opening. The cam follower is positioned in bearing contact with both the cam and the head slide. The center of the ball and the center of the shaft are on a common circle centered at the axis of the drum. Thus, when the switch shaft 928 is rotated to the correct position by the dial 404 the cam rotates to the proper station and moves the head slide the required amount. It is to be noted that when the mechanical 0–9 millisecond corrector of the timing signal is utilized the 10 millisecond increments of correction are still obtained by the Decatron circuits previously described.

Thus, the present invention provides an improved apparatus for making a visual record of data previously recorded and impresses upon the visual record a timing grid which is uniformly, linearly spaced and oriented to a preselected position with a high degree of time-scale accuracy. The present invention provides an improved playback apparatus which achieves all of the previously described objects of the invention.

What is claimed is:

1. A magnetic-tape playback apparatus for forming a visual time scale record of a tape record wherein said tape record has a time-break pulse and a timing signal consisting of a single periodic signal of substantially constant amplitude recorded thereon, said playback apparatus including: means for impressing upon said visual record a series of uniformly spaced timing lines at predetermined uniform time intervals, means for forming some of said timing lines as visually distinguishable lines at uniform multiples of said predetermined time intervals, means for transmitting the timing signal of substantially constant amplitude from said tape, means for recording said timing lines in response to said timing signal, means for detecting the occurrence of said time-break pulse transmitted from said tape, and means for recording said time break and said timing lines such that one of said distinguishable lines is recorded at a predetermined time-scale position relative to said recorded time break.

2. A magnetic-tape playback apparatus for converting a magnetic-tape record having an arbitrary time-break signal impressed thereon and having data channels and a timing signal recorded on said tape record to a visual time scale record which playback apparatus includes: means for detecting and transmitting said time-break signal to said visual record for recordation thereon, means for detecting and transmitting said timing signal from said tape record; means for generating a series of timing lines on said visual record in response to said timing signal transmitted from said tape; means varying the rate of recordation of said visual record in response to said timing signal such that said timing lines are impressed on said visual record at linearly, uniformly-spaced, predetermined time-scale intervals along the time scale direction of said visual record; and means for shifting said series of timing lines to a predetermined time-scale position relative to said time break signal on said visual record.

3. In a recording playback apparatus wherein a first record having a timing signal recorded thereon is played back to produce a second record, means for governing the rate of recording of the second record comprising: a timing signal reproducer for reproducing the timing signal present on the first record, means for producing an alternating current having a frequency proportional to said reproduced timing signal, motor-drive means connected to and driving the recording medium for the second record, said motor-drive means being an alternating-current electric motor of the type in which the rate of rotation is determined by the frequency of the driving current thereof, and means for transmitting said alternating current to said motor, so constructed and arranged that the recording medium is moved at a rate proportional to the freqeuncy of said reproduced timing signal.

4. In a magnetic-tape recording playback apparatus wherein a magnetic-tape record having a timing signal recorded thereon is played back to produce a visual time-scale record upon a recording medium which is driven past a fixed recording position, means for synchronizing the rate of visual recordation with said timing signal comprising: a reading head to detect and transmit the timing signal from the tape, means for providing an alternating current having a frequency proportional to said reproduced timing signal, motor drive means connected to and driving the visual recording medium past said recording position, said motor-drive means being an electric motor of the type in which the rate of rotation is proportional to the frequency of the driving current thereof, and means for transmitting said alternating current to said motor, so constructed and arranged that the visual record recording medium is moved past said recording position at a rate proportional to the frequency of said transmitted timing signal.

5. In a magnetic-tape record playback apparatus for forming a visual time scale record of a tape record wherein said tape record has a time-break pulse recorded thereon and said playback apparatus includes means for arbitrarily impressing a time-scale grid on said visual record, which timing grid has uniformly spaced timing lines at first time scale intervals and distinguishable timing lines at a multiple of said intervals: means for detecting and recording said time-break pulse, and means for detecting and recording the time interval occurring between said time-break pulse and the next occurring distinguishable timing line.

6. In a magnetic-tape record playback apparatus for forming a visual time-scale record of a tape record wherein said tape record has a time-break pulse recorded thereon and said playback apparatus includes means for arbitrarily impressing a time scale grid on said visual record, which timing grid has uniformly spaced timing lines at first time-scale intervals and distinguishable timing lines at a multiple of said intervals: means for detecting and recording the time interval occurring between the time-break pulse and the next occurring distinguishable timing line, and means for shifting the timing grid through a time-scale distance equal to the detected and recorded interval.

7. A magnetic-tape playback apparatus for converting a magnetic-tape record having an arbitrary time-break signal impressed thereon followed by data channels and a timing signal consisting of a single periodic signal of substantially constant amplitude recorded on said tape to a visual time scale record, which playback apparatus includes: means for detecting and transmitting said time break signal to said visual record for recordation thereon, means for detecting and transmitting said timing signal from said tape record, means for generating a series of timing lines on said visual record in response to said timing signal transmitted from said tape, means varying the rate of recordation of said visual record in response to said timing signal of substantially constant amplitude such that said timing lines are impressed on said visual record at linearly uniformly spaced predetermined time scale intervals along the time scale direction of said visual record, means for forming some of said timing lines as visually distinguishable lines at uniform multiples of said predetermined time intervals, means for detecting the time scale occurrence of said time-break pulse transmitted from said tape, and means for shifting said series of timing lines such that one of said distinguishable lines is recorded at a predetermined time-scale position relative to said arbitrarily occurring time-break signal recorded on said visual record.

8. In a magnetic-tape playback apparatus for converting a magnetic-tape record having a signal recorded in a channel of said tape record and a signal detecting and transmitting means for transmitting said signal from said tape record, means for shifting the time-scale position of said transmitted signal comprising: means for mounting said detecting means for movement along the direction of movement of said channel, a multiple position switch, means for selecting any one of said positions of said switch, means interconnecting said switch and said movable mounting means so constructed and arranged that said detecting means is moved to a position in said channel determined by said selected position of said switch.

9. In a magnetic-tape record playback apparatus for converting a magnetic-tape record having a timing signal in one channel thereof to a visual time-scale record: a magnetic head for detecting and transmitting said timing signal; means for generating a series of timing lines on said visual record in response to said transmitted timing signal; means for shifting said series of timing lines along the time scale of said visual record, said shifting means including means for mounting said detecting head for time-scale movement along said channel, a multiple position switch, a shaft operatively connected in said switch, said shaft being sequentially rotated through a portion of a revolution corresponding to the position of said switch, a cam affixed to said shaft, a cam follower affixed to said head mounting means, means electrically connected to said switch for manually selecting any one of said multiple positions to rotate said cam through a selected portion of a revolution, said cam being so constructed and arranged that each portion of a revolution thereof moves said head through a predetermined time-scale interval.

10. A magnetic-tape playback apparatus for converting a magnetic-tape record having an arbitrary time-break signal impressed thereon by data channels and a timing signal recorded on said tape record to a visual time-scale record, which playback apparatus includes: means for detecting and transmitting said time-break signal to said visual record for recordation thereon; means for detecting and transmitting said timing signal from said tape record; means for generating a series of timing lines on said visual record in response to said timing signal transmitted from said tape record; means for varying the rate of recordation of said visual record in response to said timing signal such that said timing lines are impressed on said visual record at linearly, uniformly-spaced, predetermined, time-scale intervals along the time scale direction of said visual record; means for forming some of said timing lines as visually distinguishable lines at uniform multiples of said predetermined time intervals; means for detecting the time scale occurrence of said time-break pulse transmitted from said tape; means for shifting said series of timing lines such that one of said distinguishable lines is recorded at a predetermined time-scale position relative to said arbitrarily occurring time-break signal recorded on said visual record; and means for determining and recording, prior to visual recordation, the time interval between said arbitrary occurrence of said time-break signal and said next occurring distinguishable timing line to predetermine the magnitude of said time scale shift of said series of timing lines.

11. A magnetic-tape playback apparatus for converting a magnetic-tape record having an arbitrary time-break signal impressed thereon and having data channels and a timing signal recorded on said tape record to a visual-time-scale record, which playback apparatus includes: means for detecting and transmitting said time-break signal to said visual record for recordation thereon; means for detecting and transmitting said timing signal from said tape record; means for generating a series of timing lines on said visual record in response to said timing signal transmitted from said tape record; means for varying the rate of recordation of said visual record in response to said timing signal such that said timing lines are impressed on said visual record at linearly, uniformly-spaced, predetermined time-scale intervals along the time-scale direction of said visual record; means for forming some of said timing lines as visually distinguishable lines at uniform multiples of said predetermined time intervals; means for detecting the time-scale occurrence of said time-break pulse transmitted from said tape; and means for shifting said series of timing lines such that one of said distinguishable lines is recorded at a predetermined time scale position relative to said arbitrarily occurring time-break signal recorded on said visual record.

12. A magnetic-tape playback apparatus for converting a magnetic tape record having an arbitrary time-break signal impressed thereon and having data channels and a timing signal recorded on said tape record to a visual-time-scale record, which playback apparatus includes: means for detecting and transmitting said time-break signal to said visual record for recordation thereon; means for detecting and transmitting said timing signal from said tape record; means for generating a series of timing lines on said visual record in response to said timing signal transmitted from said tape record; means for varying the rate of recordation of said visual record in response to said timing signal such that said timing lines are impressed on said visual record at linearly, uniformly-spaced, predetermined time-scale intervals along the time-scale direction of said visual record; means for forming some of said timing lines as visually distinguishable lines at uniform multiples of said predetermined time intervals; means for detecting the time-scale occurrence of said time-break pulse transmitted from said tape; and means for shifting said series of timing lines such that one of said distinguishable lines is recorded at a predetermined time scale position relative to said arbitrarily occurring time-break signal recorded on said visual record, said means including a plurality of electrical time delay circuits, a multiple position switch in which each position thereof is electrically connected to one of said delay circuits, said delay circuits being interconnected with said timing-lines-series generating means such that each of said delay circuits, when actuated by said switch, delays said generating means by a predetermined time interval, and means for selecting said switch position.

13. A magnetic-type playback apparatus for converting a magnetic-tape record having an arbitrary time-break signal impressed thereon and having data channels and a timing signal recorded on said tape record to a visual-time-scale record, which playback apparatus includes: means for detecting and transmitting said time-break signal to said visual record for recordation thereon; means for detecting and transmitting said timing signal from said tape record; means for generating a series of timing lines on said visual record in response to said timing signal transmitted from said tape record; means for varying the rate of recordation of said visual record in response to said timing signal such that said timing lines are impressed on said visual record at linearly, uniformly-spaced, predetermined time-scale intervals along the time-scale direction of said visual record; means for forming some of said timing lines as visually distinguishable lines at uniform multiples of said predetermined time intervals; means for detecting the time-scale occurrence of said time-break pulse transmitted from said tape; and means for shifting said series of timing lines such that one of said distinguishable lines is recorded at a predetermined time scale position relative to said arbitrarily occurring time-break signal recorded on said visual record, said means including a multiple position switch, a selector means for selecting any one of said positions of said switch, means interconnecting said timing-signal detection means and said switch such that said timing-signal detection means is linearly moved relative to said tape record through a predetermined distance determined by the selected position of said switch.

14. A magnetic-tape playback apparatus for converting a magnetic tape record having an arbitrary time-break signal impressed thereon followed by data channels and a timing signal recorded on said tape to a visual time-scale record, which playback apparatus includes: means for detecting and transmitting said time-break signal to said visual record for recordation thereon, means for detecting and transmitting said timing signal from said tape record, means for generating a series of timing lines on said visual record in response to said timing signal transmitted from said tape, means varying the rate of recordation of said visual record in response to said timing signal such that said timing lines are impressed on said visual record at linearly uniformly spaced predetermined time-scale intervals along the time-scale direction of said visual record, means for forming some of said timing lines as visually distinguishable lines at uniform multiples of said predetermined time intervals, means for detecting the time scale occurrence of said time-break pulse transmitted from said tape, means for shifting said series of timing lines such that one of said distinguishable lines is recorded at a predetermined time-scale position relative to said arbitrarily occurring time-break signal recorded on said visual record, and fork-oscillator-circuit means for transmitting an alternate timing signal of predetermined frequency to said timing lines generating means and to said means for varying the rate of recordation in response to said timing signal.

15. A magnetic-tape playback apparatus for converting a magnetic tape record having an arbitrary time-break signal impressed thereon and having data channels and a timing signal recorded on said tape record to a visual-time-scale record, which playback apparatus includes: means for detecting and transmitting said time-break signal to said visual record for recordation thereon; means for detecting and transmitting said timing signal from said tape record; means for generating a series of timing lines on said visual record in response to said timing signal transmitted from said tape record; means for varying the rate of recordation of said visual record in response to said timing signal such that said timing lines are impressed on said visual record at linearly, uniformly-spaced, predetermined, time-scale intervals along the time-scale direction of said visual record; means for forming some of said timing lines as visually distinguishable lines at uniform multiples of said predetermined time intervals; means for detecting the time-scale occurrence of said time-break pulse transmitted from said tape; and means for shifting said series of timing lines such that one of said distinguishable lines is recorded at a predetermined time-scale position relative to said arbitrarily occurring time-break signal recorded on said visual record, said shifting means including first time-delay means for shifting said distinguishable lines through multiples of a time interval including first and second electrical counter means, said second counter means being responsive to an electrical pulse from said first counter means and interconnected with said timing-lines-series generating means, said first counter means producing said signal upon receipt of a predetermined number of pulses selected by a dial means; said shifting means including second time delay means for shifting said timing lines through portions of said time interval including a plurality of electrical time-delay circuits, a multiple-position switch in which each position thereof is electrically connected to one of said delay circuits, said delay circuits being interconnected with said timing-lines-series generating means such that each of said delay circuits when selected by said switch, delays said generating means by a predetermined time interval, and means for selecting said switch position.

References Cited by the Examiner

UNITED STATES PATENTS

| | | | |
|---|---|---|---|
| 2,604,955 | 7/1952 | Hawkins | 340—15 X |
| 2,836,719 | 5/1958 | Manhart | 340—15 X |
| 2,948,880 | 8/1960 | Thatcher | 340—15 |

BERNARD KONICK, *Primary Examiner.*

IRVING L. SRAGOW, *Examiner.*

R. JENNINGS, F. C. WEISS, A. I. NEUSTADT, *Assistant Examiners.*